US009122861B2

(12) United States Patent
Schwesig

(10) Patent No.: US 9,122,861 B2
(45) Date of Patent: Sep. 1, 2015

(54) MANAGING DEVICE CONNECTIVITY AND NETWORK BASED SERVICES

(75) Inventor: Carsten Schwesig, San Francisco, CA (US)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 12/847,669

(22) Filed: Jul. 30, 2010

(65) Prior Publication Data

US 2012/0030773 A1    Feb. 2, 2012

(51) Int. Cl.
G06F 15/16 (2006.01)
G06F 3/048 (2013.01)
G06F 21/36 (2013.01)
H04N 21/00 (2011.01)

(52) U.S. Cl.
CPC .............. *G06F 21/36* (2013.01); *H04N 21/00* (2013.01)

(58) Field of Classification Search
CPC .......... G06F 3/048; G06F 21/24; G06F 15/16
USPC ............ 709/223, 224, 225; 705/14.52, 14.41, 705/14.44, 44
See application file for complete search history.

(56) References Cited

U.S. PATENT DOCUMENTS

| | | | |
|---|---|---|---|
| 6,636,259 B1 | 10/2003 | Anderson et al. | |
| 6,836,796 B2 | 12/2004 | Schwartz et al. | |
| 7,177,872 B2 | 2/2007 | Schwesig et al. | |
| 7,493,497 B1 * | 2/2009 | Tan, Jr. | 713/189 |
| 8,504,836 B2 * | 8/2013 | Zhang et al. | 713/169 |
| 2004/0199631 A1 * | 10/2004 | Natsume et al. | 709/225 |
| 2007/0245882 A1 | 10/2007 | Odenwald | |
| 2008/0046580 A1 * | 2/2008 | Lafuente et al. | 709/229 |
| 2008/0235587 A1 * | 9/2008 | Heie et al. | 715/719 |
| 2012/0066286 A1 * | 3/2012 | Heredia et al. | 709/201 |

OTHER PUBLICATIONS

"User Authentication on Mobile Devices"—Sethi et al, Cigital, Jun. 2009 http://www.cigital.com/wp-content/uploads/downloads/2012/11/mobile-authentication.pdf.*
Eye-Fi launches video cards that upload directly from camera to YouTube, Mar. 3 2009, downloaded from VentureBeat from http://venturebeat.com/2009/03/03/104531/.
JuiceCaster Mobile Social Network Enters European Market, Feb. 11, 2008, downloaded from LewisWire from http://www.lewiswire.com/us/lewiswire/JuiceCaster/JuiceCaster-Mobile-Social-Network-Enters-European-Market/c/170/n/622.

* cited by examiner

*Primary Examiner* — Randy Scott
(74) *Attorney, Agent, or Firm* — Haverstock & Owens LLP

(57) ABSTRACT

Methods and apparatus are provided for interoperating a device with network based services. In one embodiment, a method includes detecting registration with a service account, providing a graphical display for user selection during output associated with content stored by the device, the graphical display identifying a network based service based on the service account, and detecting user selection of the graphical display, wherein the network based service relates to a network accessible third party service associated with the device based on the service account. The method may further include transmitting the content by the device based on the user selection to the network based service.

30 Claims, 18 Drawing Sheets

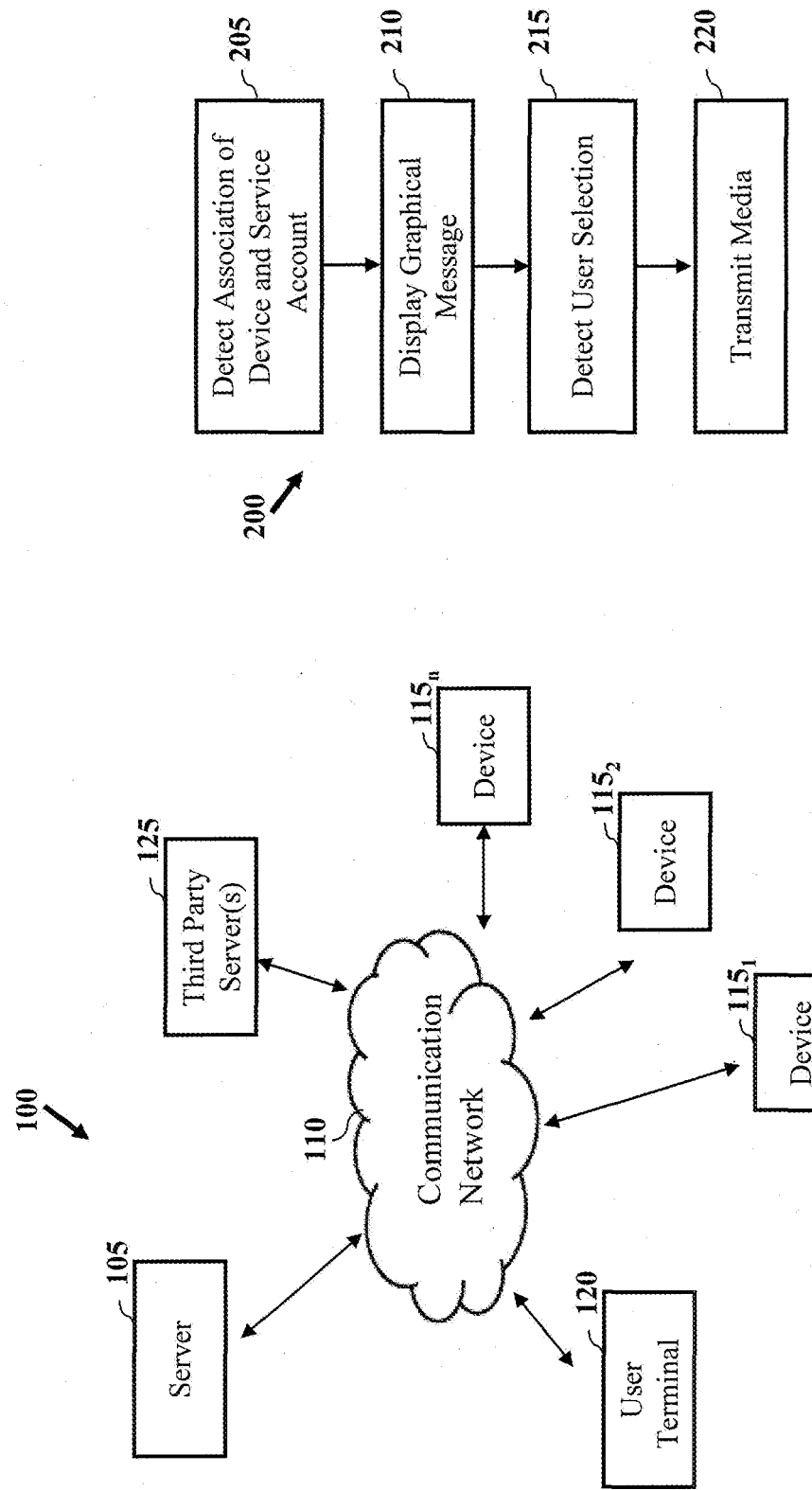

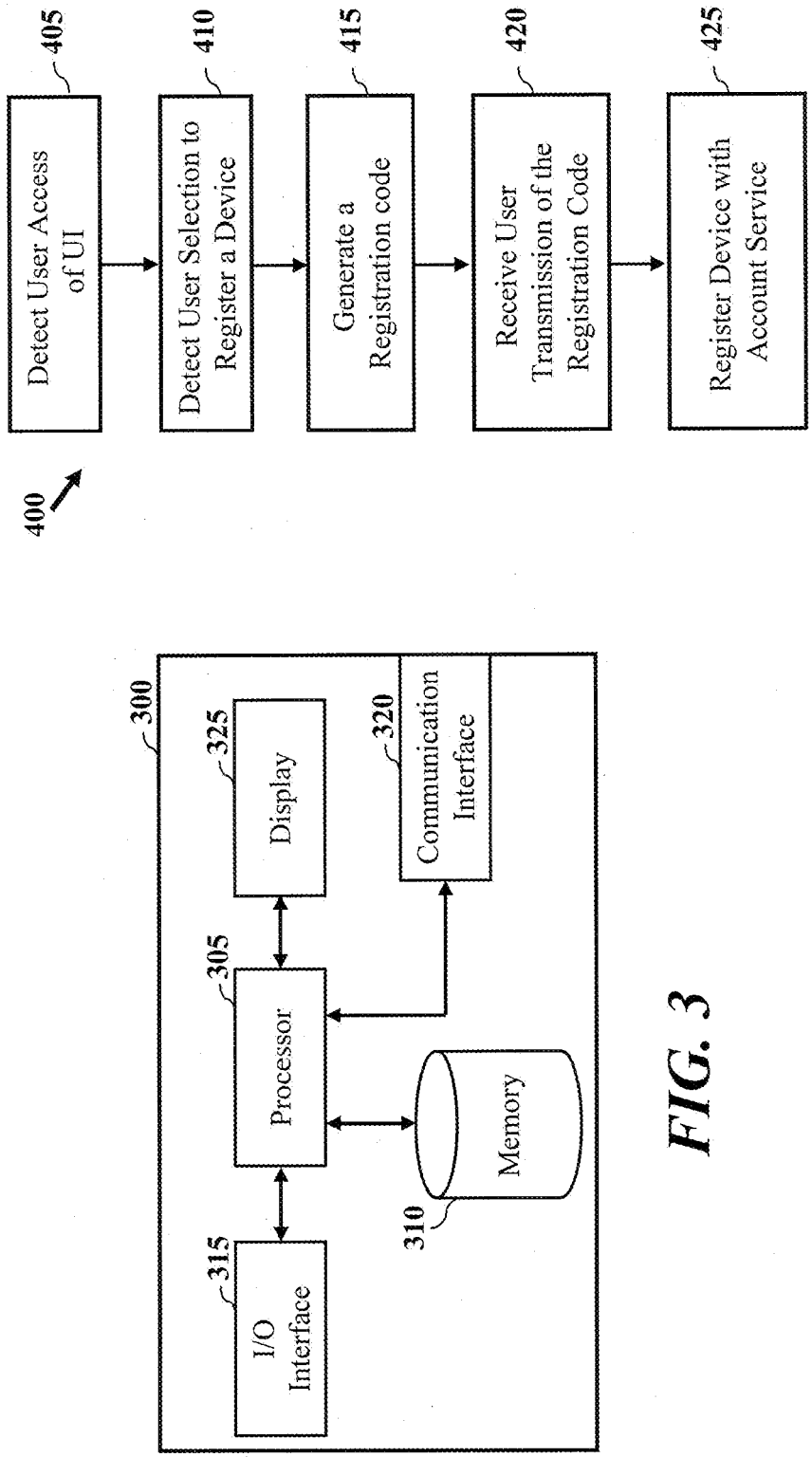

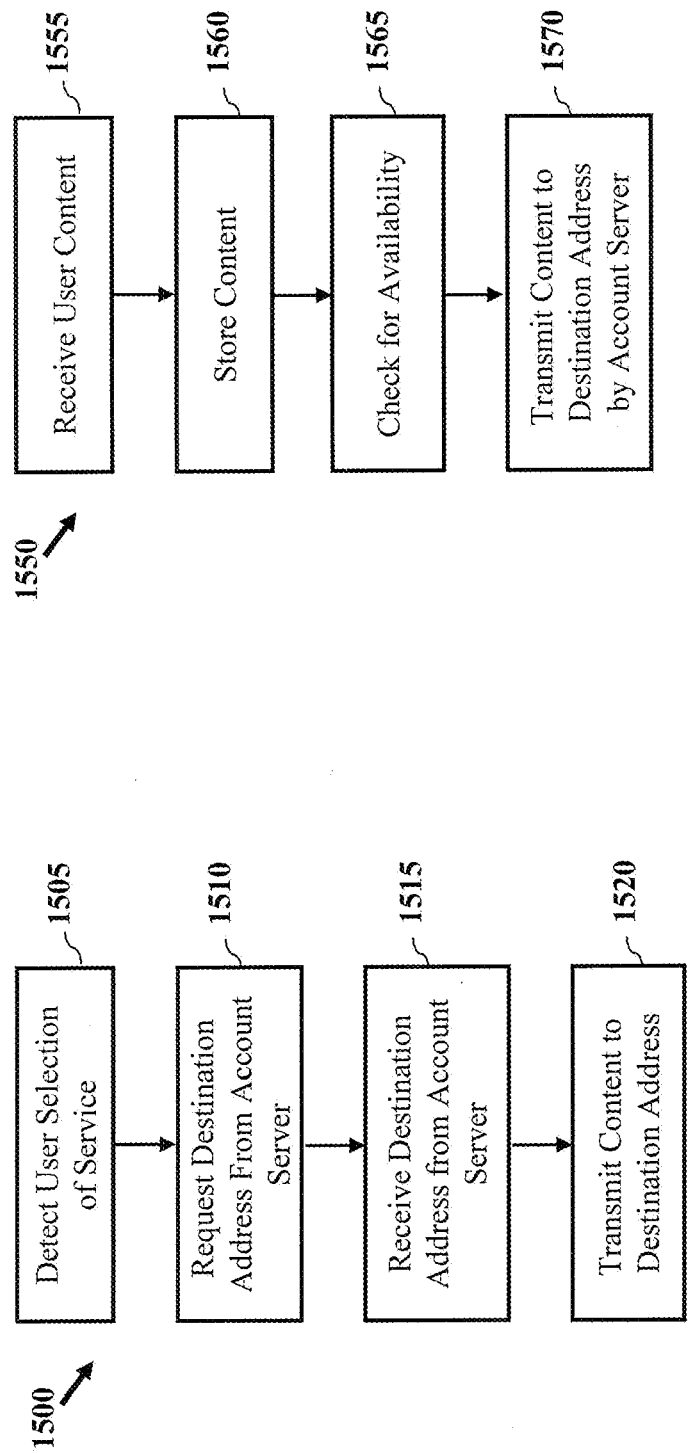

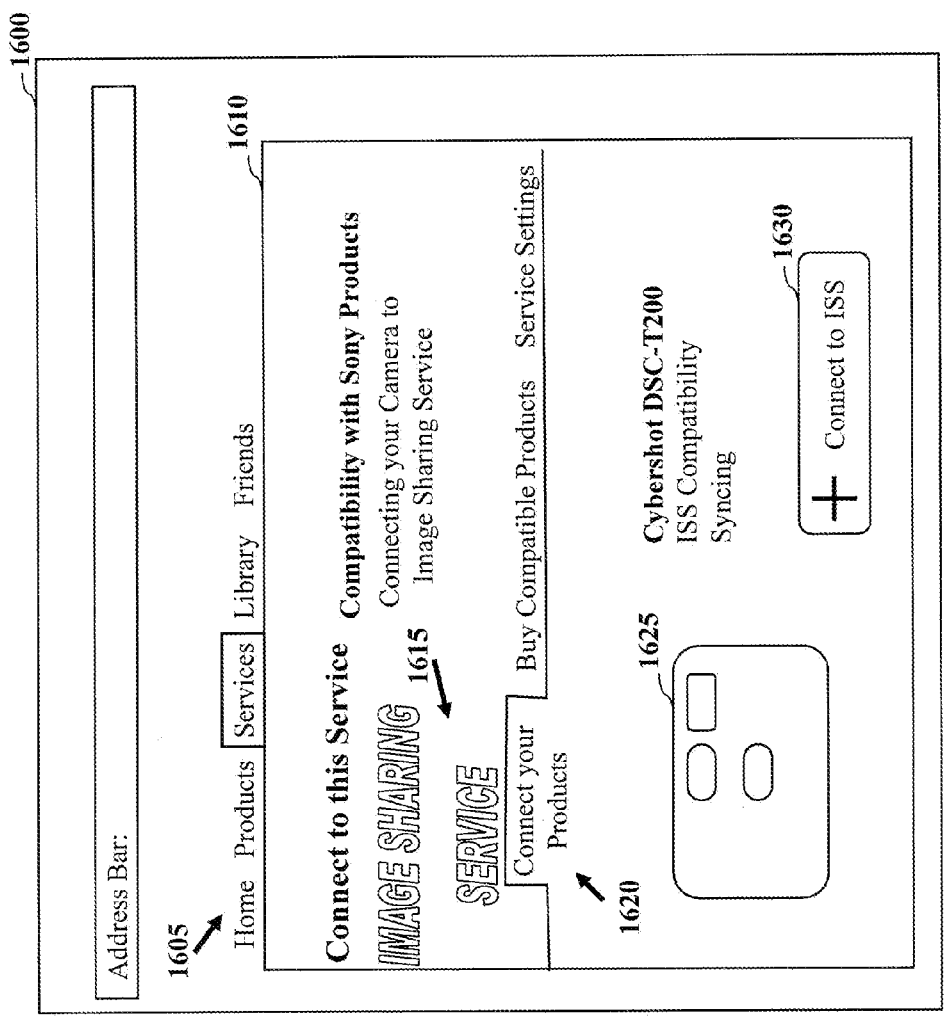
FIG. 17
FIG. 16

MANAGING DEVICE CONNECTIVITY AND NETWORK BASED SERVICES

FIELD OF THE INVENTION

The present invention relates generally to connectivity for network enabled devices, and more particularly to device interoperation with network services and management of device connectivity.

BACKGROUND OF THE INVENTION

Network based applications provide many services, including media sharing, social networking, entertainment, etc. With the development of web based applications, devices have been developed for network connectivity. Nonetheless, a drawback of many conventional devices, including network connectable devices, is the ability to transfer content to another device and/or network based application. With respect to transferring content, one conventional approach is to couple a device to computing device, in order to load content of the device on the computer for subsequent transfer based on one or more applications of the computer. This approach, however, does not allow for direct transmission of content by a device to a third party application. Another approach involves the use of third party applications loaded on devices to access a particular network based service. However, access to many network based services, such as popular social networking websites (e.g., Facebook®) and media sharing services (e.g., Flickr®, YouTube, etc.) require login for transfer of media. Further, many conventional devices doe not include a user interface to access to network based services. Accordingly, content stored on these devices must be transferred to a users computer. Another conventional approach, relates to DLNA devices to provide communication between devices. This approach, however, is typically limited to transfer of content between DLNA devices. Thus, there exists a need to manage connectivity of network enabled devices.

Further, there exists a need for managing functionality of device and third party services accessible by way of communication networks. For many web based services which require login information, there exists a desire to allow for connectivity of devices with the third party services which does not require users to manually program and manage settings of each device. Especially devices that may be less suitable for text or character input. For example, many users do not wish for a camera or photoframe to include a character entry keypad. Thus, there is a desire to improve management of user devices and a user interface that allow for improved management.

BRIEF SUMMARY OF THE INVENTION

Disclosed and claimed herein are methods and apparatus for interoperating with network based services and device management device. In one embodiment, the method includes detecting, by the device, registration with a service account, providing a graphical display, by the device, for user selection during output associated with content stored by the device, the graphical display identifying a network based service based on the service account, detecting user selection of the graphical display, wherein the network based service relates to a network accessible third party service associated with the device based on the service account, and transmitting the content by the device based on the user selection to the network based service.

In another embodiment, a system is provided including a device configured to interoperate with network based services by way of a communication network, and an account server configured to communicate with the device by way of the communication network. The account server is configured to detect registration of the device with a service account, provide a user interface for the service account to the device via the communication network, the user interface including a graphical display for user selection to manage connectivity of the device based on the service account, receive a user selection of transmitted media for a network based service based on user selection of the graphical display, and transmit the media to the network based service based on the user selection.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 depicts a simplified system diagram according to one embodiment of the invention;

FIG. 2 depicts a process for interoperating with network based services by a device according to one embodiment of the invention;

FIG. 3 depicts a simplified block diagram of a device according to one embodiment of the invention;

FIG. 4 depicts a process for device registration according to one or more embodiments of the invention;

FIGS. 15A-15B depict a processes for transferring content according to one embodiment of the invention;

FIG. 16 depicts a graphical representation of a user interface for connecting one or more devices to a third party service according to one embodiment of the invention;

FIG. 17 depicts a graphical representation of a device providing a graphical display associated with a third party service according to one embodiment of the invention;

DETAILED DESCRIPTION OF THE EXEMPLARY EMBODIMENTS

Overview and Terminology

Figure 6:
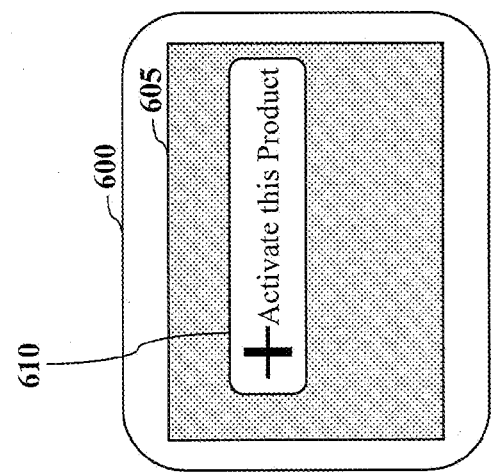
FIG. 6 depicts a graphical representation for activating a device according to one embodiment of the invention.

One aspect of the present invention relates to device interoperation with network based services. In one embodiment, a system and methods are provided for a user to establish a service account for managing connectivity of one or more user devices and network based services. A service account may relate to a personal account for an individual user. Service accounts may allow users to register compatible devices, services and media content with the service account. In one embodiment, a process is provided for interoperation of a device with network services to transmit content from a network enabled device to one or more network based services. The process may include providing a graphical display for user selection to transmit content stored in the device to a network based service based on a service account. In that fashion, content may be transmitted by the device to one or more third party applications based on user registration with a service account. Similarly, content may be transmitted by the device to one or more devices registered with the service account.

Another aspect of the invention is directed to managing user devices and device settings. In one embodiment, users may manage one or more device settings based on registration and connection with a service account. Management of device settings based on the service account may allow for remote configuration of one or more devices. As a result, one or more device settings may be changed for devices with minimal or no user interface. Similarly, tasks that require text input, such as the input of payment information can be handled on a user access terminal via a communication network. In certain embodiments, device settings may further be accessible to customer support for improved service and analysis.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Embodiments

Referring now to the figures, FIG. 1 depicts a simplified system diagram according to one or more embodiments of the invention. In one embodiment, system 100 may be provided for managing connectivity between one or more user devices, and services based on a service account. As depicted, system 100 includes service account server 105, communication network 110, devices $115_{1-n}$, user terminal 120, and one or more third party servers shown as 125.

System 100 may be configured to provide one or more functions for a user based on a service account. In one embodiment, user devices $115_{1-n}$ may be associated with the service account. In another embodiment, third party services may be associated with a service account. The service account may additionally allow for: association of physical and/or digital media with the users service account; management of connections between one or more devices registered with the service account; managing connection of products to third party services; managing device settings remotely by a user; technical support; remote browsing of data stored on a device; managing connectivity between devices based on a users relationships with third party social networks; and/or managing device connectivity in general.

Service account server 105 may be configured to manage one or more service accounts. In one embodiment, users and/or owners of a device may register the device with service account server 105. Users may then access the service account, via a user interface associated with the service account. A service account may provide service functionality and interaction patterns for managing connectivity between one or more devices associated with a service account and services. Although depicted as having a single service account server in FIG. 1, it may be appreciated that system 100 include a plurality of service account servers. Communication network 110 may allow for one or more of wired and wireless communication. For example, communication network may allow for network based communications including but not limited to LAN, WAN, WI-FI, etc.

In one embodiment, devices $115_{1-n}$ may be configured for network communication with one or more network entities, such as account server 105 and one or more third party servers 125 via communication network 110. Each service account may allow for a plurality of different device types. Accordingly, devices $115_{1-n}$ may relate different types of devices. For example, devices $115_{1-n}$ may relate to one or more of a TV, photoframe, camera, imaging device, media player (e.g., DVD, Blu-ray™, audio player, etc.), personal communication device. In one embodiment, users of devices $115_{1-n}$ may create, access, and/or manage a service account via the device. In certain embodiments, devices $115_{1-n}$ may only include limited user interface controls.

According to another embodiment, users may create, access, and/or manage a service account via a user terminal 120. User terminal 120 may relate to a computing device (e.g., personal computer, laptop, etc.) and may be configured to communicate with service account server 105 via communication network 110. One advantage of the invention may be to provide media associated with one or more devices to third party servers without requiring a user to first transfer the media to user terminal 120. According to another embodiment, management of the devices via user terminal 120 may be provided based on a service account. Once a service account is created by the user, the user may access the service account from service account server 105 to manage devices, social networking relationships, etc.

Referring now to FIG. 2, a process is depicted for managing connections of a device according to one or more embodiments of the invention. Process 200 may be performed by one or more of the devices of FIG. 1 for interoperation with one or more services based on a service account. In an exemplary embodiment, process 200 may be employed for transmitting content, such as media, to at least one of another device registered with the service account, and a third party application service. Process 200 may be initiated by detecting an association of the device with a service account at block 205. In one embodiment, association of the device with the service account relates to registration of the device for communication with one or more of a server associated with the service account (e.g., service account server 105) and a server associated with a third party application. As will be discussed in more detail below with respect to FIG. 4, a service account may be created during user registration of a device. Based on device registration, the device may receive information and/or data to recognize an association with the service account. In certain embodiments, the service account may provide a compatibility service relative to one or more devices, and users associated with a user based on the service account.

Process 200 may continue by the device displaying a graphical display (e.g., message, icon, etc.) at block 210. In one embodiment, one or more of a graphical message, or display indicator may be displayed by the device to notify a user that media may be transmitted from the device based on the service account. Display at block 210 may be performed by the device during user operation of the device. For example, during playback of media on the device, such as image data, the device may display a graphical message that a user may select. Media output by the device may relate to image data, audio data, video, table identifying media, etc. The graphical message may identify a third party service, device associated with the service account, user and/or friend, service account, etc. Display of the graphical message may be temporary, and may coincide with display and/or playback of media. In certain embodiments, the graphical message may be a graphical icon which may be displayed during viewing of media by a user. When the device relates to a camera, the graphical display may be provided by the device following capture of image data. In one embodiment, the graphical display relates to a pop-up graphical display including an identifier of one or more of a third party application, and a device associated with the user's service account.

At block 215, selection of the graphical display may be detected by the device. Selection may relate to user selection of a button on the device, user selection of a touch screen displaying the graphical display, and/or user manipulation of one or more input/output elements of a user interface of the device. Based on the user selection, the device may transmit content associated with the selection at block 220. In one embodiment, transmitting media relates to transmission to a server associated with a third party application. In another embodiment, transmitting media relates to transmission to a device associated with the users service account.

Although, process 200 has been described above with reference to media or a media file, it should be appreciated that other types of data and or files may be transmitted by a device based on process 200.

FIG. 3 depicts a simplified block diagram of a device according to one embodiment of the invention. In one embodiment, device 300 may be configured to interoperate with one or more services based on registration with a service account. As shown in FIG. 3, device 300 includes processor 305, memory 310, input/output (I/O) interface 315, and network communication interface 320. Processor 305 may be configured to control operation of device 300 based on one or more computer executable instructions stored in memory 310. Memory 310 may relate to one of RAM and ROM memories and may be configured to store one or more media files, content, and computer executable instructions for operation of device 300.

I/O interface 315 may include one or more buttons for user input, such as a numerical keypad, volume control, channel control, menu controls, pointing device, track ball, mode selection buttons, and playback functionality (e.g., play, stop, pause, forward, reverse, slow motion, etc). Buttons of I/O interface 315 may include hard and soft buttons, wherein functionality of the soft buttons may be based on one or more applications running on device 300. I/O interface 315 may be configured to allow for one or more devices to communicate with device 300 via wired or wireless communication. I/O interface 315 may include one or more ports for receiving data, including ports for removable memory. In another embodiment, device 300 may include one or more optical drives, not shown in FIG. 3, which may be configured to detect and decode one or more media files stored on a disc (e.g., CD, DVD™, Blu-ray™, etc.).

Network communication interface 320 may be configured to allow for network based communications including but not limited to LAN, WAN, Wi-Fi, etc. Display 325 may be employed to display one or more of a user interface for a service account, menu functions, media file identifiers, sources of media files, etc.

Referring now to FIG. 4, a process is depicted for registering a device with a service account according to one or more embodiments of the invention. In one embodiment, association of a device (e.g., device 300) with a service account may be based on registering the device with an account server. Registration of a device with a service account may be performed by a user following purchase of the device. In certain embodiments, devices may be pre-loaded with software and/or computer executable program code to allow a user to register the device during initialization and startup of the device. Compatible devices maybe configured for communication with a network (e.g., temporary, constant connection) and may be configured to support one or more software and/or computer executable programs for a service account.

Process 400 may be initiated at block 405 based on user access of a service account. In one embodiment, a user interface may be provided by an account server (e.g., account server 105) via a communication network for access to a service account. The user may access the account server and register a device based on the user interface via a user terminal (e.g., user terminal 120). In another embodiment, users may access the a UI interface to register a device with a service account using a device to be registered. Process 400 may continue by detecting user selection to register a device at block 410. User selection at block 410 may be based on user selection of the interface. Alternatively, user registration may relate to selection of a pop-up image displayed by a device to be registered. Based on the user selection at block 410, the account server may generate a registration code at block 415. In one embodiment, the registration code may relate to a display pattern which may be displayed by the user interface and emulated by the user on a device for registration. In certain embodiments, the registration code may relate to a certain pass phrase made up on one or more words, string of characters, etc.

At block 420, a user transmission of the registration code may be received. At block 425, a device may be registered with the account service when the registration is verified.

Figure 5:
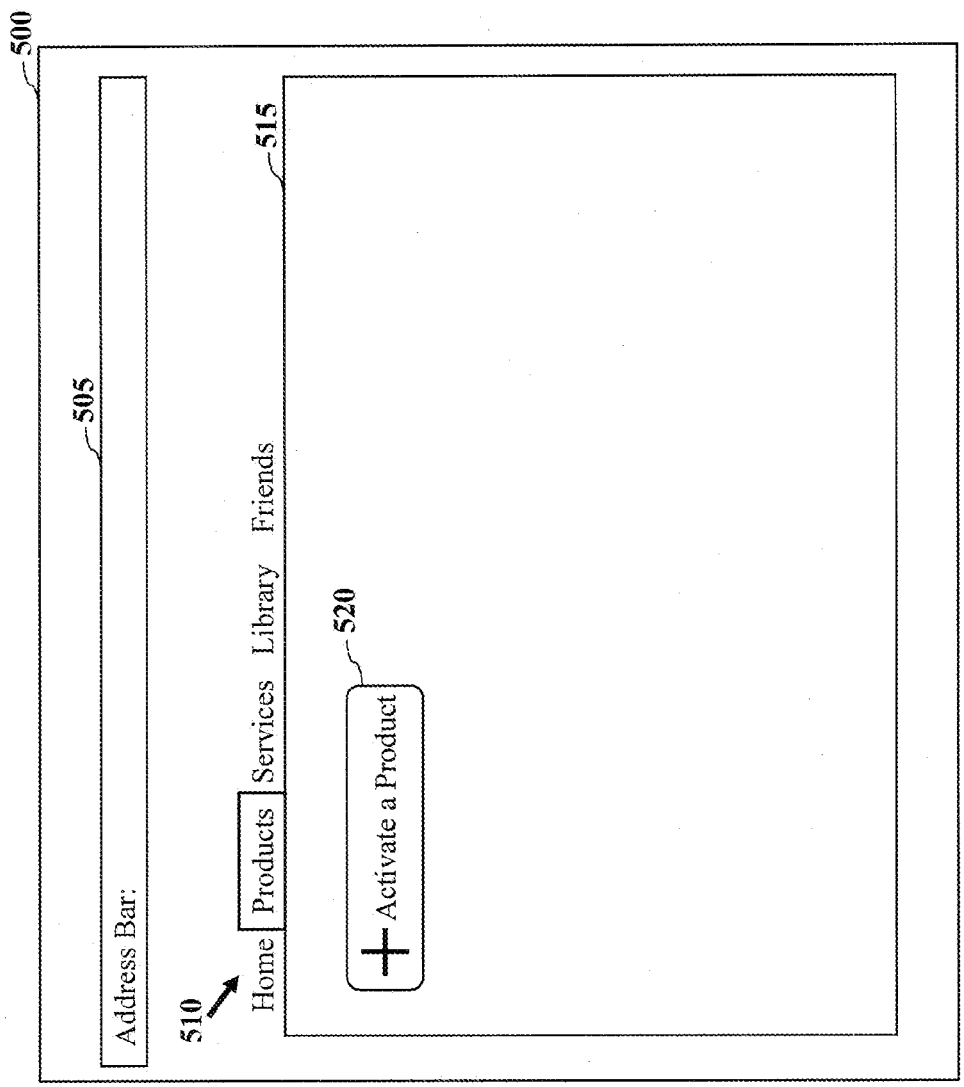
FIG. 5 depicts a graphical representation of a user interface of a service account according to one or more embodiments of the invention.

Referring now to FIG. 5, a graphical representation is depicted of a user interface of a service account according to one or more embodiments of the invention. User interface 500 may relate to a user interface displayed during access to an account server (e.g., account server 105) by one or more of a device to be registered with the service account and a user terminal. In certain embodiments, the user interface may be provided by a network browser application. As depicted in FIG. 5, user interface 500 includes address bar 505 which may be employed to access the address of an account server (e.g., URL associated with the account server). In certain embodiments, address bar 505 may be employed to access one or more third party services, such as photo-sharing websites, social networking websites, etc.

User interface 500 includes a plurality of tabs, shown as 510, each of which may be selectable by the user for one or more management functions associated with a device. Based on a user selection, such as "Products" as depicted in FIG. 5, a window may be displayed by the user interface. Window 515 includes a selection button 520 for activating a product when no devices have been registered.

Referring now to FIG. 6, a graphical representation is depicted for activating a device according to one embodiment of the invention. Device 600 includes display 605 and may be configured to provide graphical display 610 to "activate this product." Graphical display 610 may be displayed by the device during the first power up. Based on the user selection of the graphical display, the device may be configured to transmit data to an account server (e.g., account server. In some instances, the device may prompt the user to register with a service account when and/or enter account credentials.

According to one embodiment of the invention, registration of a device with a service account may be based on an activation pattern generated by an account server. By way of example, based on user selection of a graphical display to register a device, an account server may generate and transmit an activation pattern. In one embodiment, the activation pattern may be sent to a user terminal employed by a user to register a device.

Figure 7:
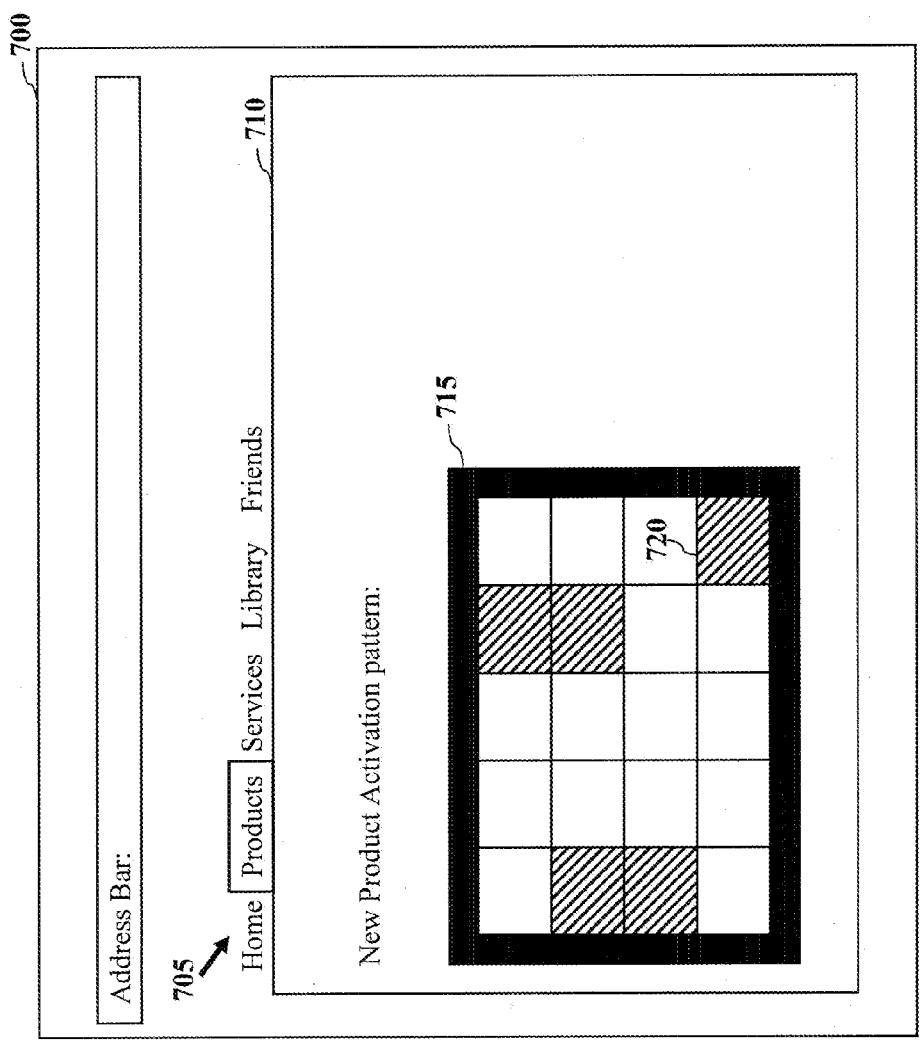
FIG. 7 depicts a graphical representation of a user interface for displaying an activation pattern according to one embodiment of the invention.

Referring now to FIG. 7, a graphical representation is depicted of a user interface displaying an activation pattern according to one or more embodiments. Based on user selection of a graphical display on a user interface (e.g., graphical display 520) and/or a graphical display on a device (e.g., graphical display 610), a user interface may display a product activation pattern received by an account server. As depicted in FIG. 7, selection of a "Products" tab, shown by 705, of the user interface may display window 710 including activation pattern 715. Activation pattern 715 relates to a grid pattern wherein certain blocks are selected or marked, shown as 720. an activation pattern may allow for device manufactures to limit the number of buttons and or user interface options required on the device. Based on the displayed product activation pattern, a user can register a device by emulating the activation pattern on the device. When an account server receives the proper activation pattern from a device, the account server may register the particular device to the service account. One advantage of employing the service account based on an activation pattern may be to simplify entering a key code on the device. It may also be appreciated that a user enter device credentials into the user interface in one embodiment.

Figure 8:
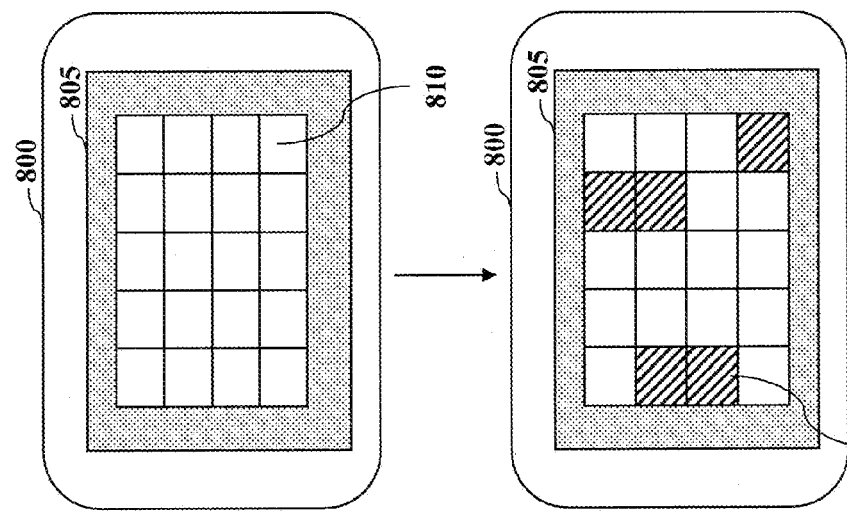
FIG. 8 depicts a graphical representation of entering a product activation pattern on a device according to one embodiment of the invention.

Referring now to FIG. 8, a graphical representation is depicted of entering a product activation pattern on a device according to one embodiment. Based on user selection of a graphical display on a user interface (e.g., graphical display 610), a user interface of the device may be prompted to display a pattern for the user to emulate the activation pattern. As depicted in FIG. 8, device 800 may display empty pattern. Display window 805 includes empty pattern 810, wherein boxes of the pattern are uniform according to one embodiment. Based on user selection of the device, the display window may update the graphical display shown as display window 815. By emulating a pattern display on a user interface of a terminal, the user may authenticate the device.

Figure 9:
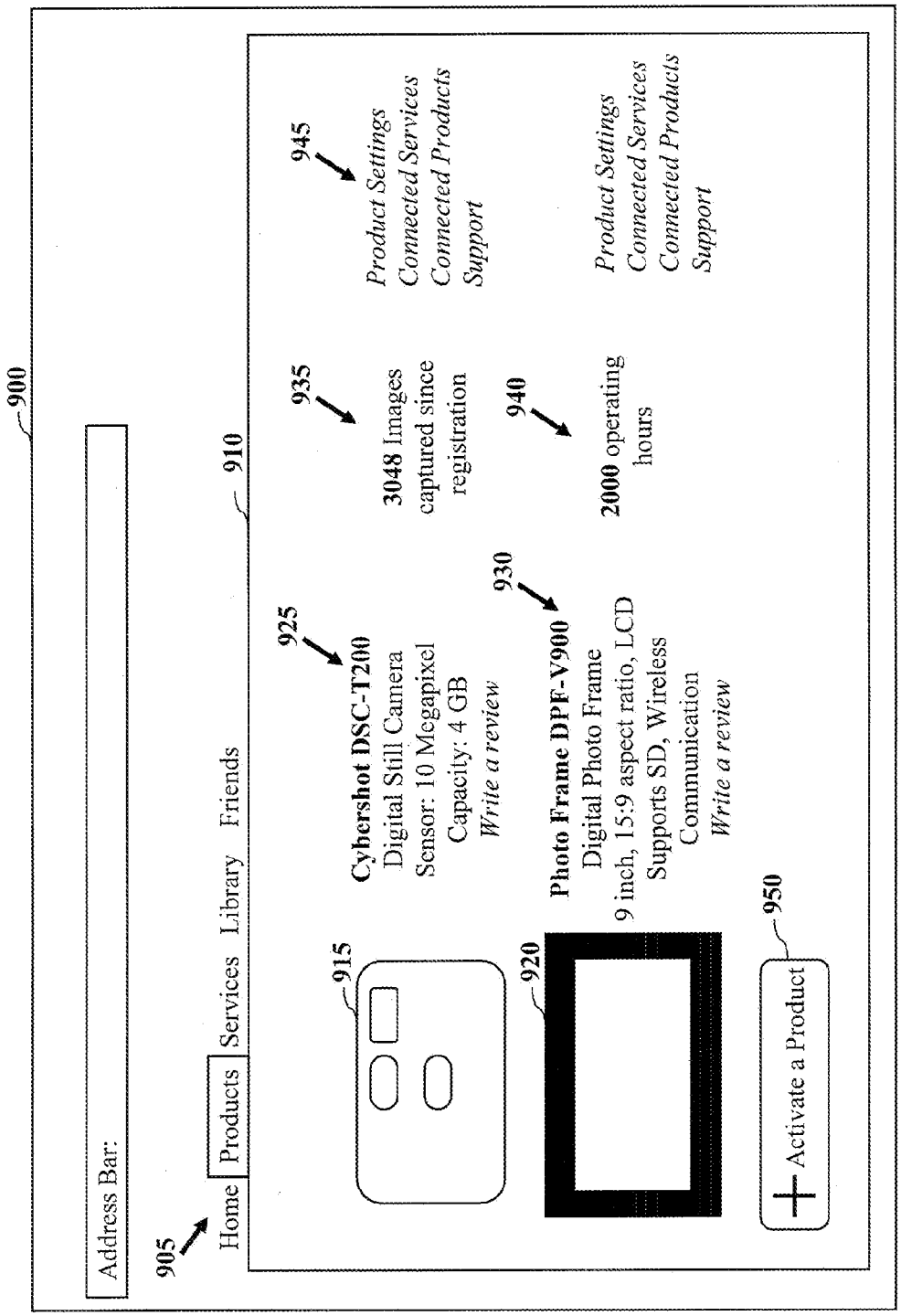
FIG. 9 depicts a graphical representation of a user interface for displaying registered devices according to one embodiment of the invention.

In certain embodiments, once a devices is associated with a service account, a user interface of the service account may display one or more registered devices. Referring now to FIG. 9, a graphical representation is depicted of a user interface according to one or more embodiments of the invention. Based on user selection of a "Products" tab, shown as 905, the user interface may display window 910 identifying one or more device associated with the service account. Display window 910 may include a graphical display of each device associated with the service account, such as camera 915 and photoframe 920. Display window 910 may further include identifying information for the camera shown as 925, and identifying information for the photoframe shown as 930. According to another embodiment of the invention, the display window may allow for management of the devices based on data of the device. For example, the account server may be configured to request data of the device, such as available storage space for camera shown as 935, and/or battery operating life for the photoframe shown as 940. Display window 910 may further include one or more selectable links, shown as 945, a user may select to receive information and manage a device including but not limited to product settings, connected services, connected products, and support. Display window 910 may additionally display graphical display 950 to activate one or more additional products.

Figure 10:
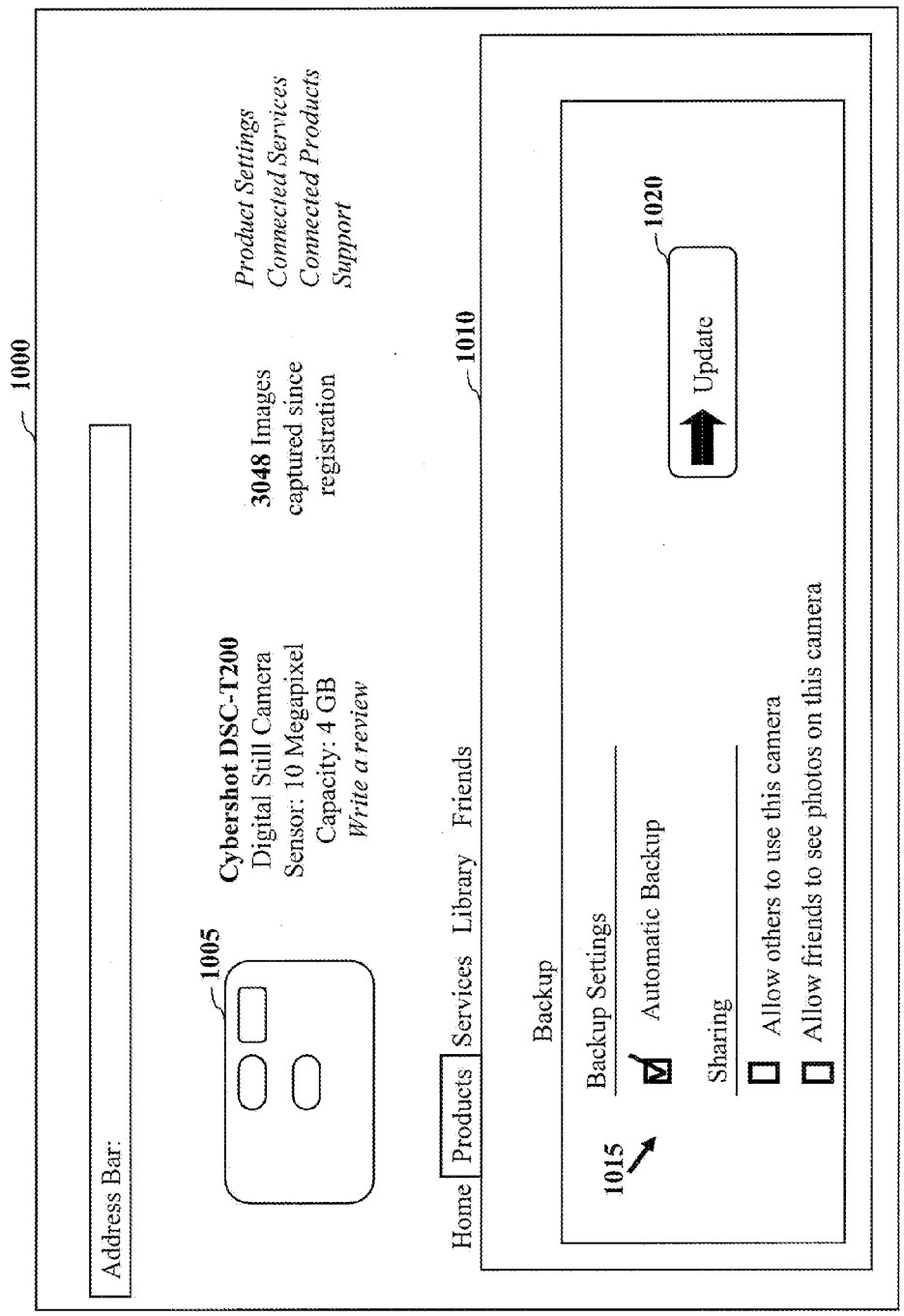
FIG. 10 depicts a graphical representation of a user interface for managing device settings according to one embodiment of the invention.

Referring now to FIG. 10, a graphical representation is depicted of a user interface according to another embodiment of the invention. User interface 1000 may be employed for configuring a device. For example, user selection of a device (e.g., camera 915) can result in graphical display of the device shown as 1005 and window 1010 including on or more selections for configuring set-up of the device. For example, as shown by 1015, the user interface may allow a user to set-up backup settings of the device, and configuration of media sharing associated with the device to allow or restrict others from viewing media on the device based on the network communication ability of the device. Once selections are made, such as by selection of a check box, the user may select update button 1020 to store setting of an account server. In that fashion the user interface may transmit the update settings to an account server.

Figure 11:
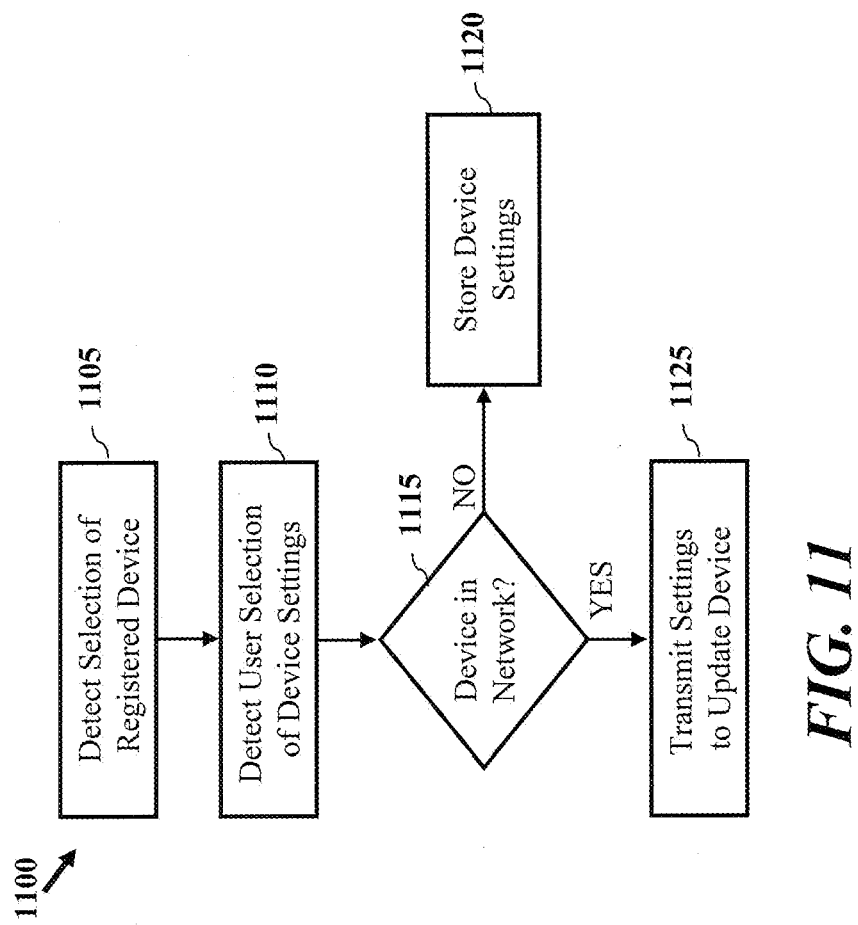
FIG. 11 depicts a process for changing device settings according to one embodiment of the invention.

Referring now to FIG. 11, a process is depicted for changing device settings according to one embodiment of the invention. In one embodiment, device settings may be accessed and/or changed using a service account. In that fashion, management of one or more remotely located devices associated with the service account may be provided. Similarly device operation may be controlled. For example, a movie download at a users residence may be initiated for a device by assessing the service account. Process 1100 may be initiated by detecting selection of a registered device on a user interface at block 1105 and detection of one or more settings of a device at block 1110. In one embodiment, settings accessible by the service account may relate to full device settings, a subset of device settings, and a settings not accessible on the device itself. The account server may then check to determine if the device may be reached via the network (e.g., network 110) at block 1115. When a device is not reachable via the network ("NO" path out of decision block 1115), the account server may then store device settings at block 1120. When a device is reachable via the network ("YES" path out of decision block 1115), the account server may then transmit user selected device settings at block 1125 to the device. In that fashion, management of device features may be provided based on an service account.

Process 1100 may advantageously allow for changing one or more setting of devices with minimal or no user interface, such as a digital photoframe. Similarly, tasks that require text input, such as the input of payment information can be handled on a user access terminal which includes a full-size keyboard. In certain embodiments, device settings may further be accessible to customer support for improved service and analysis.

Figure 12:
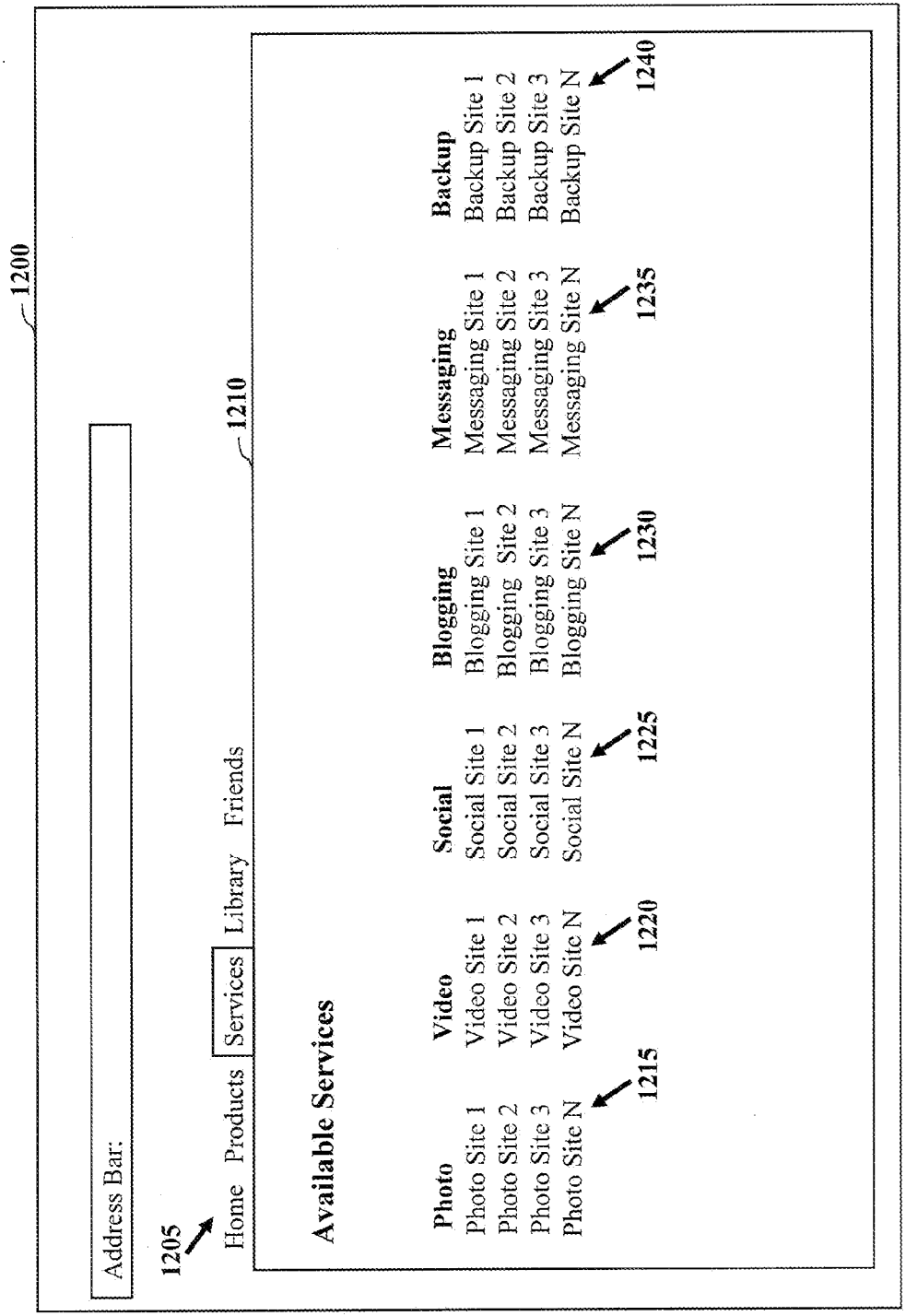
FIG. 12 depicts a graphical representation of a user interface for selecting one or more services based on a service account according to one embodiment of the invention.

Referring now to FIG. 12, a graphical representation is depicted of a user interface for selecting one or more services based on a service account. User interface 1200 may include display of services, such as third party services based on selection of a services tab, shown by 1205. According to one embodiment, user interface 1200 may be configured to populate display window 1210 with third party applications for photo sharing 1215, video sharing 1220, social networking 1225, blogging 1230, messaging 1235, and data back up 1240. In another embodiment, the user interface may allow for a user to specify one or more services.

Figure 13:
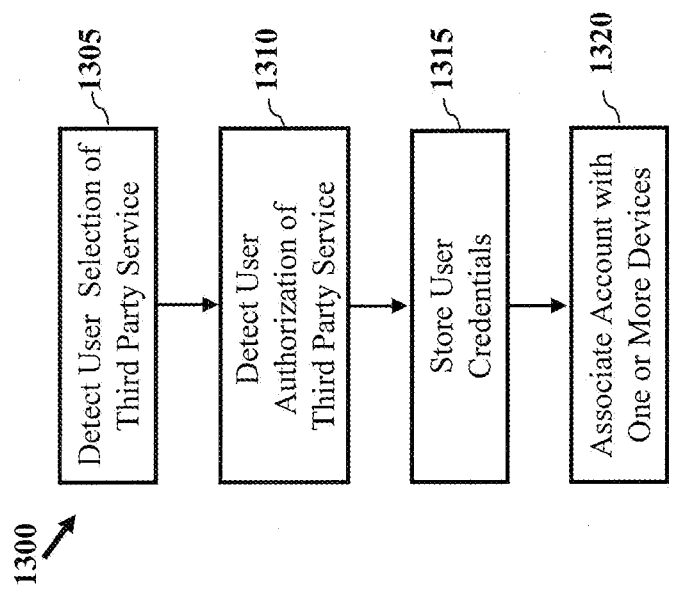
FIG. 13 depicts a process for registering a third party service with a service account according to one embodiment of the invention.

Referring now to FIG. 13, a process is depicted for registering a third party service with an account. A service account may allow for a user to associate preferred third party services with the account. Process 1300 may be initiated by detecting user selection of a third party service at block 1305. Third party services may be provided by one or more of public application programming interfaces (APIs) and negotiation of support wit the third party service provider. Detection of the third party service may be on a user interface provided by an account server (e.g., account server 105) and/or via an application on a device. At block 1310, the account server may detect user authorization of a third party service. Authorization of the third party service may be provided by a user providing credentials for storage with the service account via the user interface. By storing user credentials for a third party service, the service account can allow for connections to the service for any devices or other third party services registered to the service account. The account server may store the user credentials at block 1315 and associate the third party account with one or more devices at block 1320. In one embodiment, user credentials may relate to user login information including user identification and password. Alternatively, it may be appreciated that user credentials stored at block 1315 provide access to a third party service without requiring the login identification and password of the third party service. For example, one or more of a public key identifier and certificate may be employed for user authentication. One advantage of registering a third party service with a service account may be that changes to the third party service authentication (e.g., password change) need only to be made once, not individually on every device associated with the service account.

Figure 14:
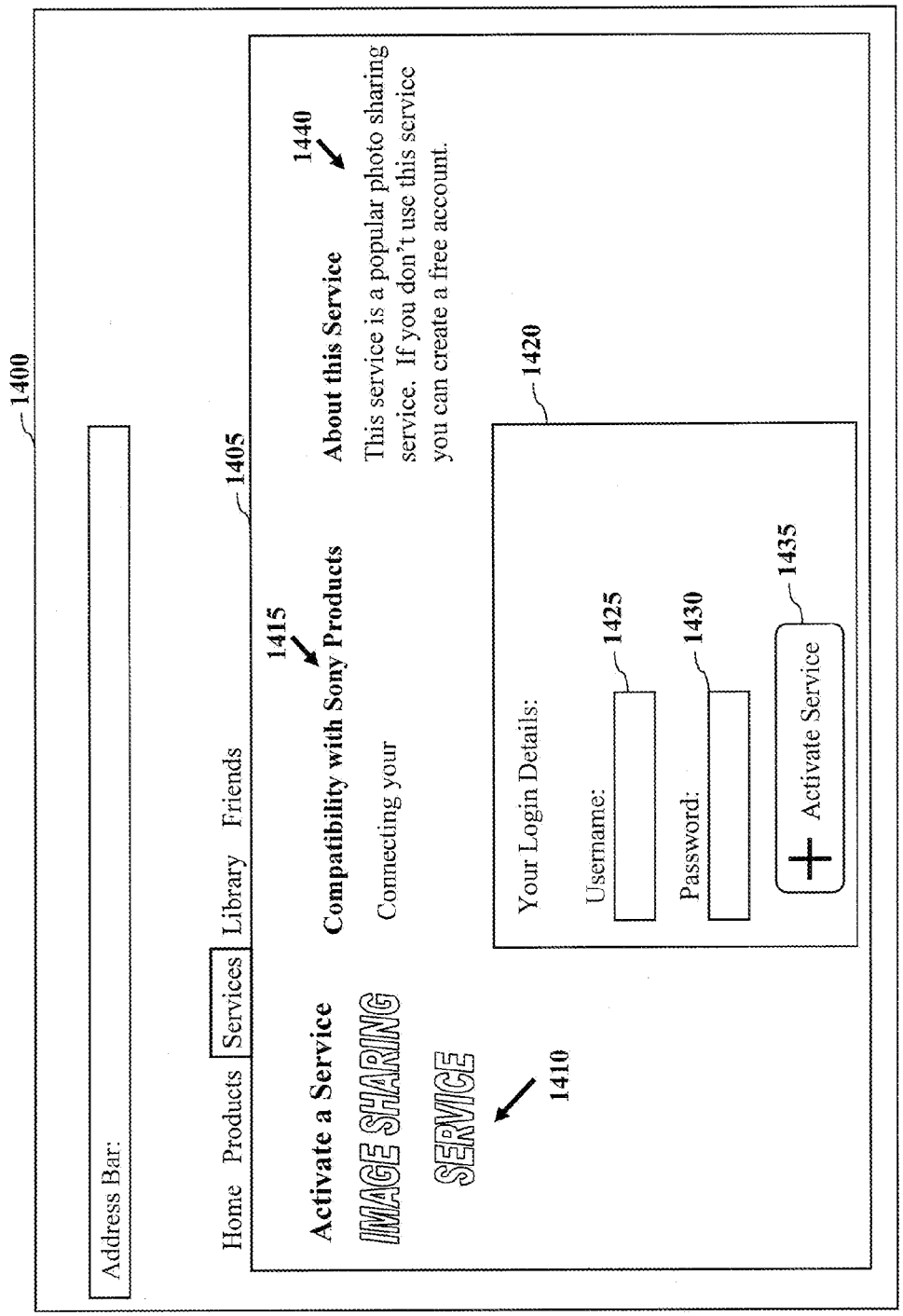
FIG. 14 depicts a graphical representation of a user interface for registering a third party service with a service account according to one embodiment of the invention.

Referring now to FIG. 14, a graphical representation is depicted of a user interface for registering a third party service with a service account. User interface 1400 may allow for integration of a third party service with a service account. As depicted, user interface 1400 may display window 1405 based on user selection of a service. By way of example, FIG. 14 includes display of an Image Sharing Service (e.g., third party service). Display window 1405 may include display of a graphical element associated with the service, shown as 1410. Display window 1405 may additionally include a description, shown as 1415, of the service and login window 1420. By entering credentials, such as a username in box 1425 and password in box 1430, a user may associate the service account with the third party service by selecting activate service button 1435. Display window 1405 may further include service information, shown as 1440, to provide a description of the service.

According to another embodiment, content may be exchanged relative to a device and services associated with the device based on the service account. The service account may support direct transfer of data between a source and destination that are both associated with the service account. Alternatively, or in combination, content may be transferred indirectly, wherein content is first transferred to the service account via the communication network, and then forwarded to a destination.

FIGS. 15A-15B depict processes for transferring content, such as media. Referring first to FIG. 15A, process 1500 is depicted for direct transfer of content from a device to a third party server or application. Process 1500 may be initiated by detecting user selection of a service at block 1505. For example, the user may select a graphical display to transmit media, such as an image on the device to a third party service (e.g., ISS 1410). Based on the detected user selection, a device may request a destination address from one of the third party service and the account server at block 1510. The device may then receive a destination address at block 1515 and transmit the content directly to the destination address (e.g., a third party service). In certain embodiments, a network address of the third party service may be stored by the device.

Referring now to FIG. 15B, a process is depicted for indirect transfer of content associated with a device according to one embodiment. In certain embodiments a device may transmit content to an account server via a communication network for transmission by the account server to a third party service. One advantage of process 1550 may be to avoid transmission from the device to a plurality of servers, by providing a single transmission point. Further, the account server may allow for repeated attempts to transfer data without requiring a user to login to the third party website via the device. Process 1550 may be initiated at block 1555 by the account server receiving content from the device. The account server may then store the content at block 1560 and check for availability of the third party service at block 1565. When the service is available, the content may be transmitted to the designated address by the account server at block 1570. In certain embodiments, process 1550 may be employed to transfer content to a device. For example, transfer of content from a user device, such as a camera, to another user device, such as a digital photoframe, associated with the users service account.

In that fashion, processes 1500 and 1550 may be employed to transmit a photo from a camera to a display device, such as a display or photoframe, wherein transmitting and receiving devices are associate with the service account. Similarly, a photo may be transmitted from a third party service, such as a social networking site, and a photoframe, wherein the third party service and photoframe are each associated with the service account. In a further example, processes 1500 and 1550 may be employed to transmit content, such as one or more photos, from a camera to a third party service, such as a social networking service, where each of the camera and third party service are associated with the same service account.

Referring now to FIG. 16, a graphical representation is depicted of a user interface for connecting one or more devices to a third party service. User interface 1600 may be provided based on selection of a services tab, shown as 1605, for display of window 1610. Based on user selection of services tab 1605, the user interface may allow users to manage service account. Based on selection of a service, such as Image Sharing Service 1615, window 1610 may allow for a user to connect one or more products to the service, view products that may be compatible with the service, and manage one or more settings associated with the service. As further depicted in FIG. 16, Connect your products tab, shown as 1620, is selected. User interface window 1610, may display one or more devices, such as camera 1625 which may be associated with service 1615. A user may associate device 1625 with the service, ISS 1615, by selecting graphical display 1630. Based on the selection the account server may associate a user device with the service.

Referring now to FIG. 17, a graphical representation of a device providing a graphical display associated with a third party service is depicted. Device 1700 includes display 1705 which may be employed for playback of content stored by the device. In certain embodiments, device 1700 may be configured to display a graphical display to allow a user to transfer content to one or more services associated with a service account. As depicted, graphical display 1710 may be employed to transmit displayed content on display 1705 to a service, such as a third party service. In that fashion, users of a device may transfer content from a device associated with the service account to a third party service via a network connection, without the need to manually transfer content first to an intermediary device.

Figure 18:
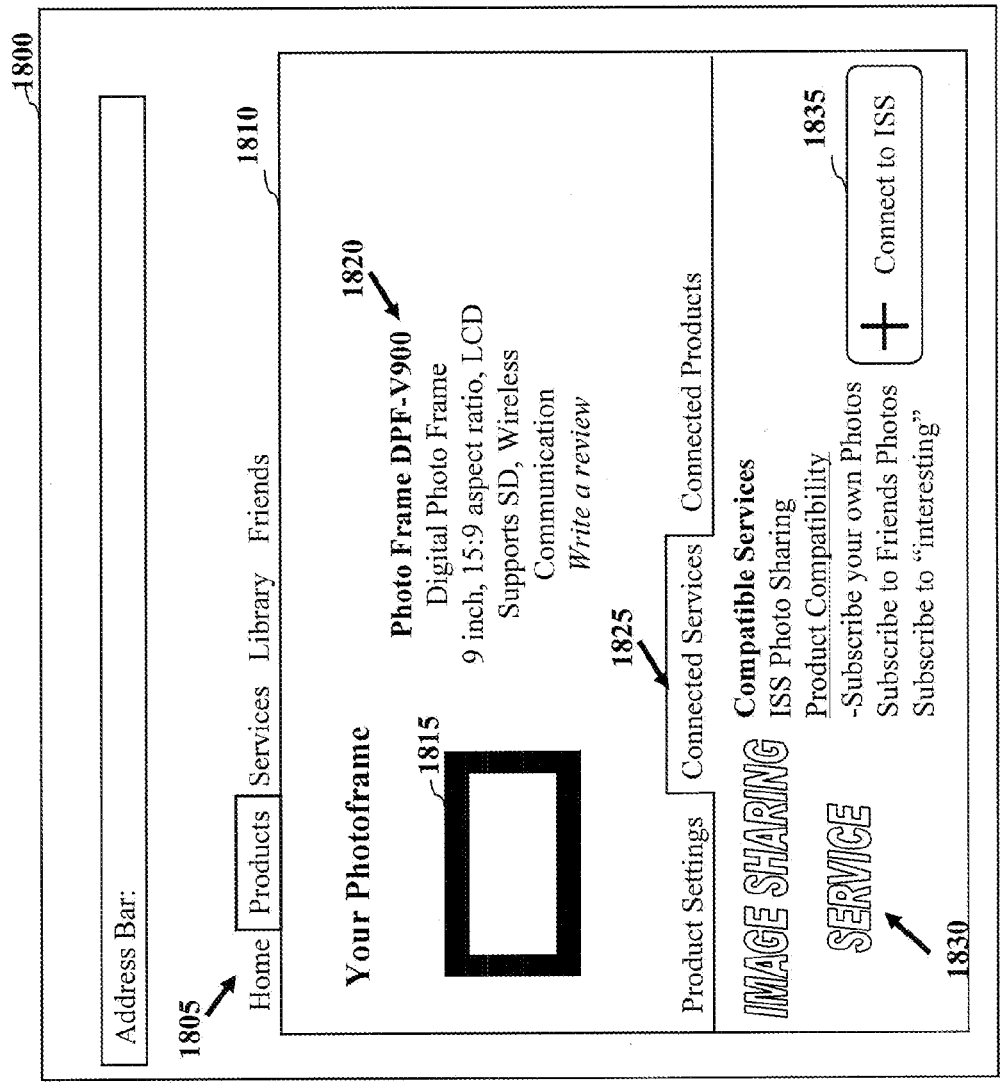
FIG. 18 depicts a graphical representation of a user interface for connecting a device to a third party service according to one embodiment of the invention.

Referring now to FIG. 18, a graphical representation is depicted of a user interface for connecting a device to a third party service. User interface 1800 depicts selection of a products tab, shown as 1805, wherein a device associated with the service account may be displayed in window 1810. For example, photoframe 1815 is display by the user interface. Window 1810 may include information associated with photoframe 1815, shown as 1820. Window 1810 of user interface 1800 may allow a user to select connected services tab, shown as 1825, for associating one or more services with photoframe 1815. As depicted, the connected services tab may display information associated with one or more services, such as the image sharing service 1830. A user may select graphical selection button 1835 to associate the image sharing service with photoframe 1815.

Figure 19:
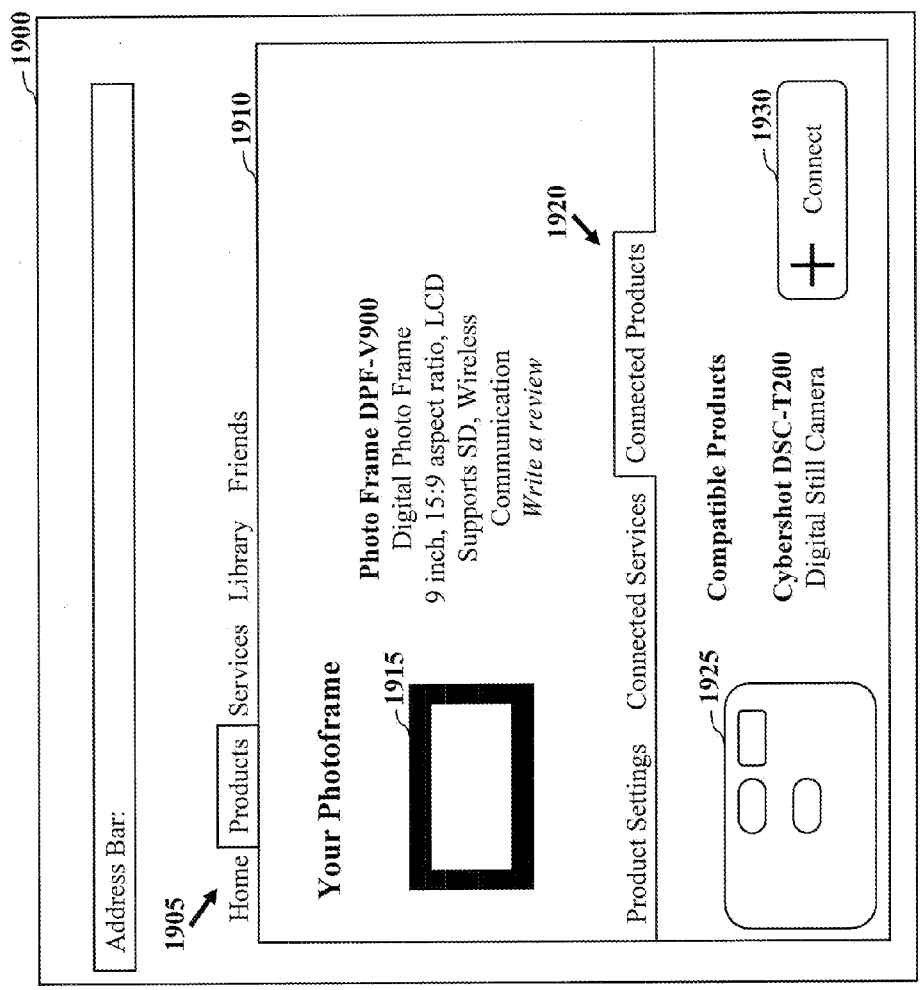
FIG. 19 depicts a graphical representation of a user interface for managing device connections according to one embodiment of the invention.

Referring now to FIG. 19, a graphical representation is depicted of user interface for managing device connections. User interface 1900 may include window 1910 for managing connections to photoframe 1915 based on user selection of connected products tab, shown as 1920, in window 1910, the user can manage transfer of content relative to photoframe 1915 and camera 1925. By way of example, user selection of graphical display 1930 may result in transfer of content stored by device 1925 to photoframe 1915. Alternatively, or in combination, user selection of graphical display 1930 may establish a connection between photoframe 1915 and camera 1925 wherein content may be automatically transferred to photoframe 1915.

Figure 20:
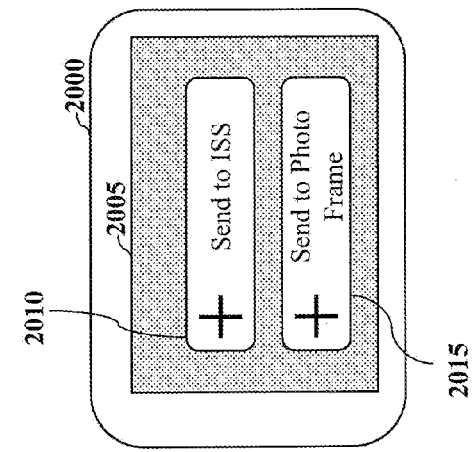
FIG. 20 depicts a graphical representation of a device providing a graphical display associated with a third party services and registered devices according to one embodiment of the invention.

Referring now to FIG. 20, a graphical representation is depicted of a device according to one embodiment of the invention. Device 2000 may include display 2005 for display of content. Display 2005 may further display graphical display 2010 for user selection to transmit content to a third party service based on a service account. Similarly, display 2005 may include graphical display 2015 which may be selected to send content displayed to a device, shown as a photoframe. Transmission of content may be performed by the device based on user selection.

Figure 21:
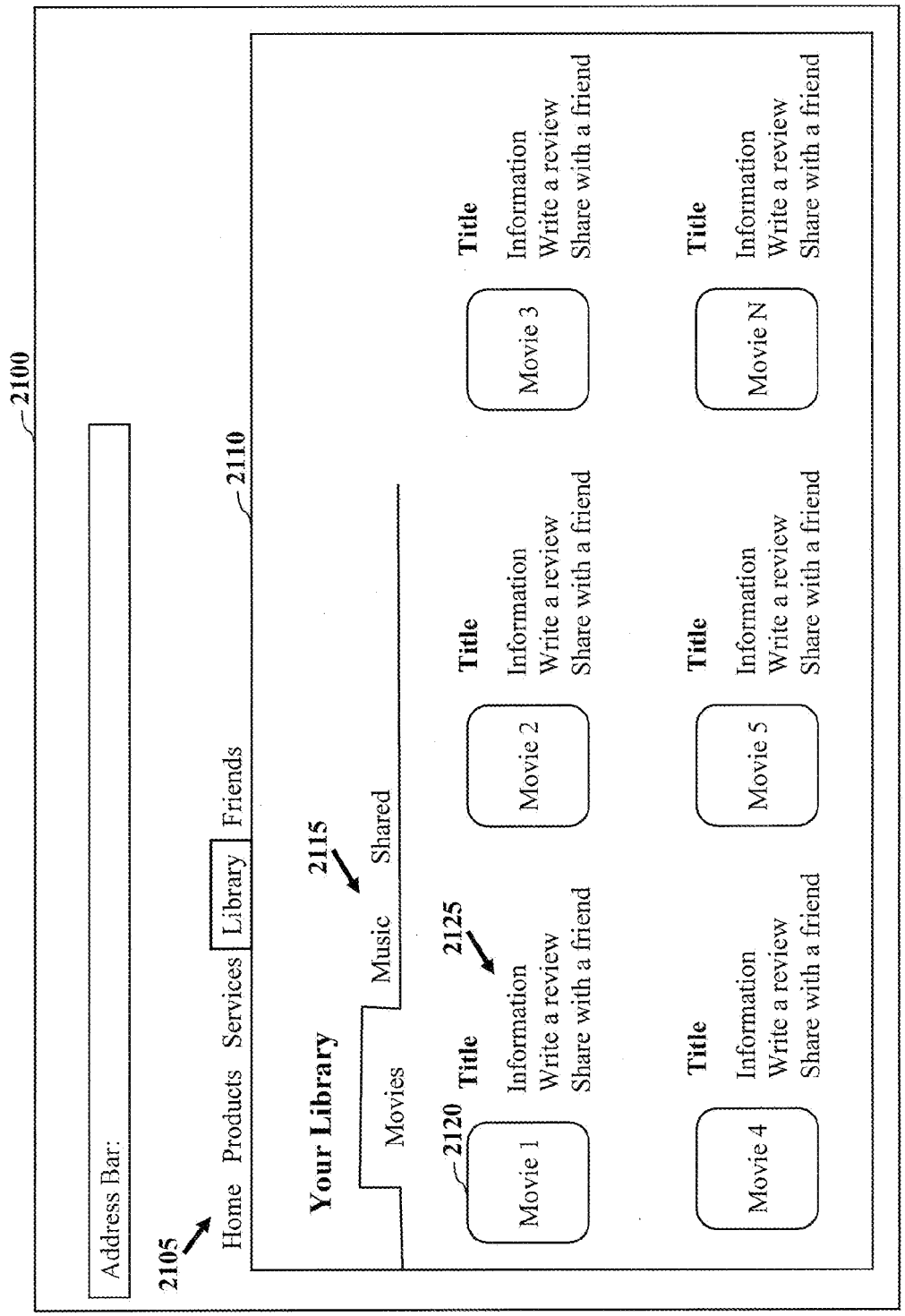
FIG. 21 depicts a graphical representation of a user interface for managing content associated with one or more devices registered with the service account according to one embodiment of the invention.

Referring now to FIG. 21, a graphical representation is depicted of a user interface for managing content associated with one or more devices registered with the service account. Based on user selection of a library tab, shown as 2105, display window 2110 of user interface 2100 may display a users library shown as 2115. The users library may relate to one or more media files and/or media content played by one or more devices associated with the service account. As depicted in FIG. 21, library 2115 may include content for movies, music and shared content. It should also be appreciated that the user interface may store additional types of content and/or media such as digital books, videos, etc. A movie listing for example may including a plurality of movie titles, wherein a graphical image associated with the movie may be displayed, shown as 2120. User interface window 2110 may further include display of information and/or links associated with movie 2120 including title, information, a user review link, and link to share with a friend (based on a social network).

In certain embodiments, information associated with content may be determined by the user device reading an identifier associated with the media. For example, some digital disc media (e.g. Blu-ray™) may include a unique identifier which may be read by the device and provided to the account server. Based on the unique ID, the account server may be configured to retrieve additional content, such as special features, deleted scenes, associated with the media content.

Figure 22:
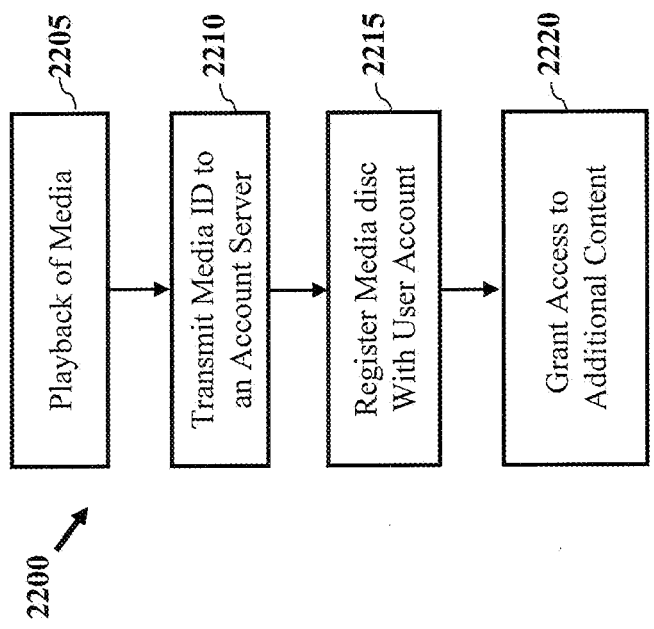
FIG. 22 depicts a process for registering digital media content with a service account according to one embodiment of the invention.

Referring now to FIG. 22, a process is depicted for registering digital media content with a service account. Physical media may contain individual identification for each manufactured medium to allow users to provide ownership and secure access to digital content, such as individual identification codes embedded in high definition optical media discs. In one embodiment, registration of physical media with a service account may provide user access to additional content. For example registering an optical data disc may secure access to associated video content in a different format (e.g., a phone friendly format). In another embodiment, registering physical media with a service account may allow for access to additional media content such as outtakes, commentary, and special features in general. Process 2200 may be initiated by playback of media on a device at block 2205. For example, the device may play an optical data disc such as a Blu-ray™ disc. Playback of the media may include decoding data associated with content and metadata such as a unique identifier. At block 2210, the device may transmit the media ID to an account server. The account server may then register media content with the user service action at block b and grant the user access to additional content at block 2220.

Figure 23:
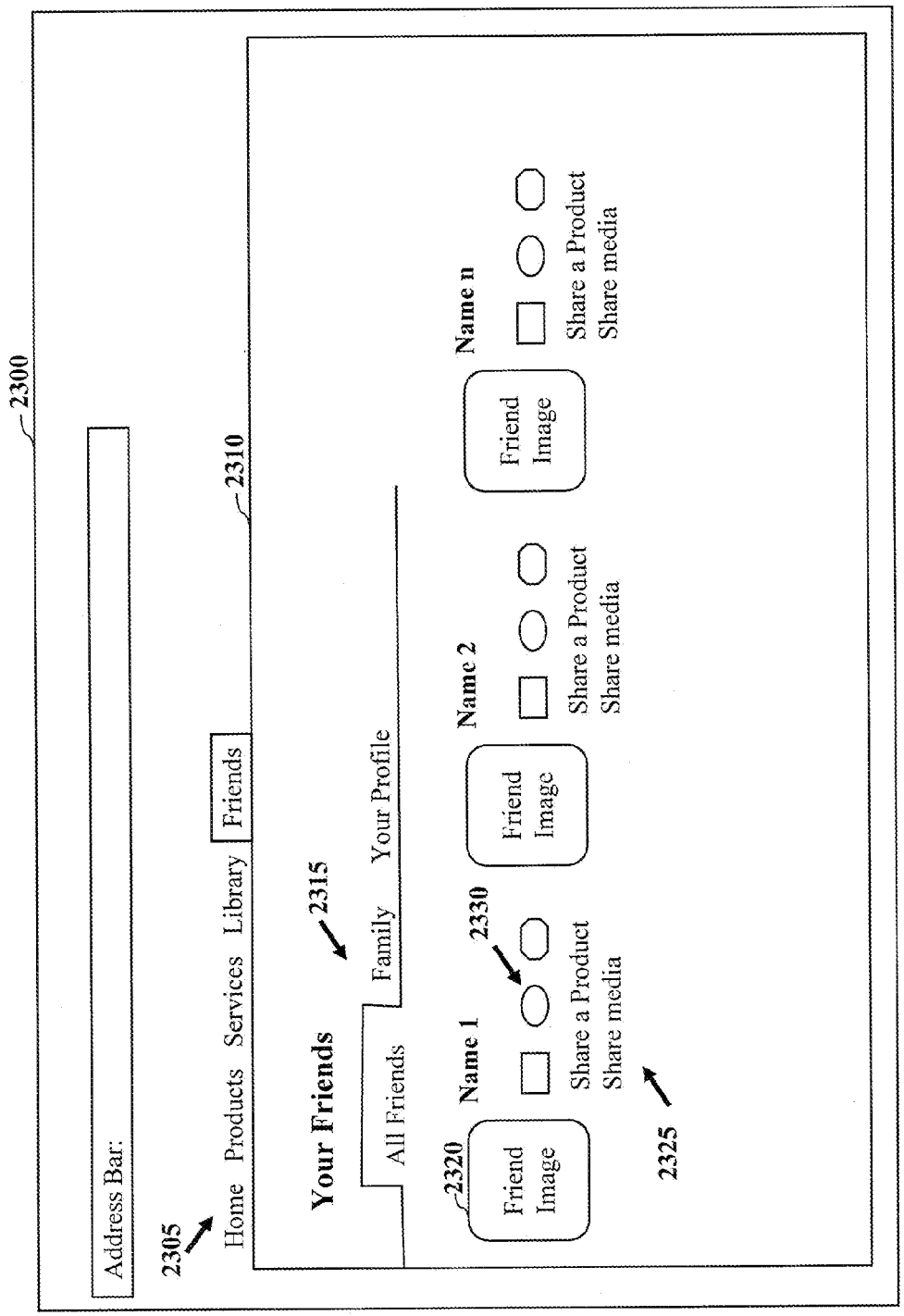
FIG. 23 depicts a graphical representation of a user interface for managing social relationships associated with a service account according to one embodiment of the invention.

Referring now to FIG. 23, a graphical representation is depicted of user interface for managing social relationships associated with a service account. Based on user selection of a friends tab, shown as 2305, display window 2310 of user interface 2300 may display a one or more user with service accounts associated with a user shown as 2315. Display window 2310 may include tabs for selecting friends based on all friends, family, and/or a tab to manage a user profile. As depicted, window 2310 may include content for one or more social associations including image data 2320 for each friend. Data associated with a friend may be retrieved from a third party application or social networking site based on one or more services associated with a service account. In certain embodiment's icons may be displayed associated with each third party application associated with a friend shown as 2330. Based on user selection of the social networking icon, user interface 2300 may access the social networking site. According to another embodiment of the invention, the user interface may allow for a user to share content or media associated with a device with the social network site as shown by 2325. For example, user interface 2300 may allow for a user to transfer content to post on a friends social networking site.

Figure 24:
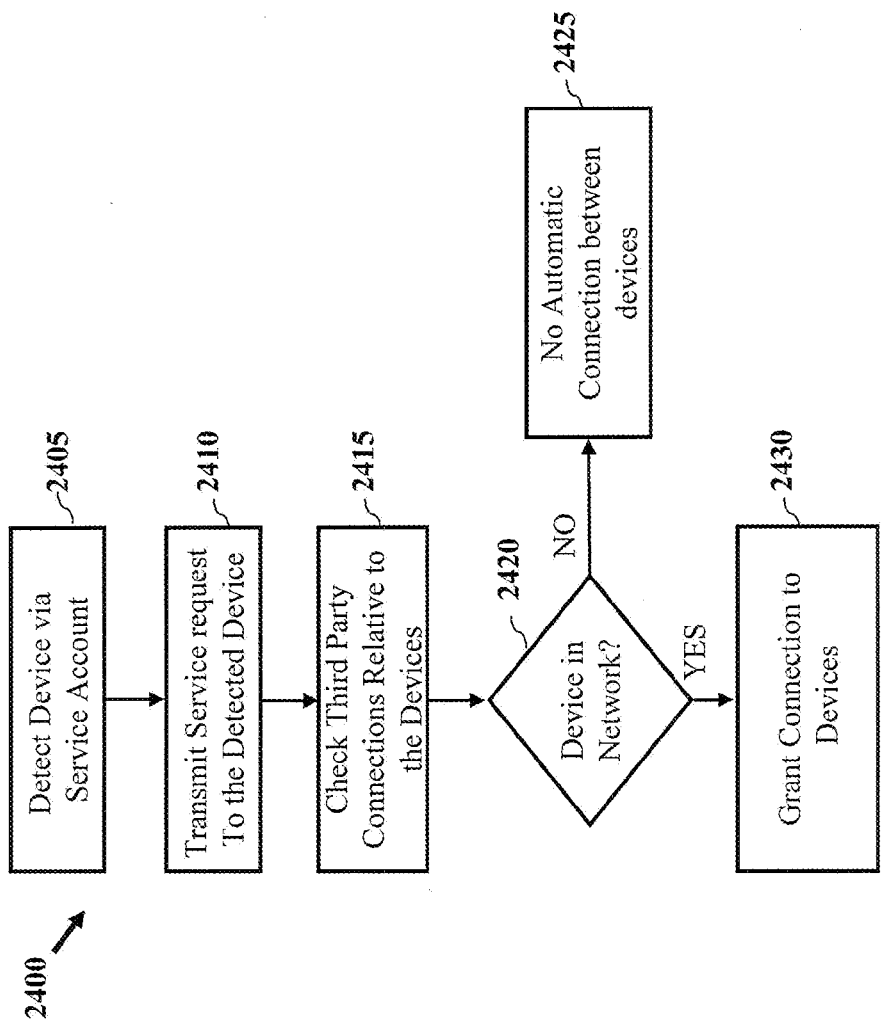
FIG. 24 depicts a process for managing device connectivity based on social relationships according to one embodiment of the invention.

Referring now to FIG. 24, a process is depicted from managing device connectivity based on social relationships. Social relationships may relate to one or more friends or associations provided by a third party social networking service, wherein the users friends are registered with a service account. In certain embodiments, social relationships may be provided by a service account with one or more other users registered with the service account. In one embodiment, a device may be configured to transmit media to another device based on a users social relationship. Transmission of content can require that devices registered with each users service account are compatible. Transfer of content may be provided based on a service account and social relationship between the users of each service account. Process 2400 may be initiated by detecting a device via the service account. For example, the user of a first device may detect one or more devices associated with another user via the service account. Identification of devices may be based on a particular device of the first user, such as an imaging device. Using the service account and/or a user interface provided by the account server or application executed on the first users device, a service request may be transmitted to the second users device at block 2410. The service request may relate to a connection request for transferring content. Alternatively, or in combination, the service request may check if the second device is currently operating and/or in a powered state. At block 2415, connections of the devices to a third party application may be checked. For example, the device connections may be checked if connected to a social network. At determination block 2420, the second device may be checked to determine if the device is coupled to the network. When the second device is not in the network (e.g., "NO" path out of decision block 2420), automatic connection of the devices will not be performed as shown by block 2425. When the second device is coupled to the network (e.g., "YES" path out of decision block 2420), an automatic connection will be granted to the devices at block 2430. In that fashion, the first and second devices may be connected to allow for a user of the first device to view content stored on the second device. In one embodiment, data may be transferred via the third party application associating the two devices. According to another embodiment, content may be transferred between devices via a communication network using the network address of each device. Content may also be transferred relative to the devices based on the account server associated with the service account.

Process 2400 may additionally allow for a first user to browse content of another user, such as photos, on a device associated with the first users service account, such as a display device (e.g., photoframe, TV, etc.). Similarly, process 2400 may be employed by a first user to send photos from a camera registered with the first users service account to a second users photoframe. It may also be appreciated that a first user and a second user may be able to access photos captured by the first users camera and the second users camera for an event each attended based on metadata associated with time and location of the images captured.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A method for interoperating with network based services by a device, the method comprising the acts of:
   detecting, by the device, registration with a service account;
   providing a graphical display, by the device, for user selection during output associated with content stored by the device, the graphical display identifying a network based service based on the service account, wherein the network based service comprises a social networking service;
   detecting user selection of the graphical display, wherein the network based service relates to a network accessible third party service associated with the device based on the service account;
   transmitting the content by the device based on the user selection to the network based service; and
   displaying a grid pattern for a user to enter an access code for registration, and detecting user selected portions of the grid pattern for transmission for device registration.

2. The method of claim 1, wherein registration with the service account relates to registration of the device for communication with an account server to manage connectivity of the device with one or more third party services.

3. The method of claim 1, wherein the service account relates to a network accessible user interface to manage connectivity of the device with one or more user devices associated with the service account and one or more devices associated with the user based on social networking associations with third party services.

4. The method of claim 1, wherein the graphical display is displayed during display of image data by the device.

5. The method of claim 1, wherein the graphical display relates to a pop-up display message including an identifier of one or more of a third party service and device associated with the service account of the user.

6. The method of claim 1, wherein transmitting content relates to transmission to a server associated with a third party service, wherein the content is transmitted to a user account of the third party service based on user credentials stored by the service account.

7. The method of claim 1, wherein transmitting content relates to transmission to an image display device associated with a service account of the user.

8. The method of claim 1, further comprising receiving a configuration command by the device based on selection of a user interface of the service account, and configuring operation of the device based on received configuration commands.

9. A device, comprising:
a display;
a transceiver configured to provide wireless communication with a communication network;
a memory; and
a processor coupled to the display, transceiver and memory, the processor configured to:
detect an association of the device with a service account;
providing a graphical display for user selection during output associated with content stored by the device, the graphical display identifying a network based service based on the service account, wherein the network based service comprises a social networking service;
detect user selection to transmit media stored in the device to the second location based on user selection of graphical display, wherein the second location relates to a network accessible location associated with the device based on the service account;
transmit the media by the device based on the user request; and
display a grid pattern for a user to enter an access code for registration, and detecting user selected portions of the grid pattern for device registration.

10. The device of claim 9, wherein registration with the service account relates to registration of the device for communication with an account server to manage connectivity of the device with one or more third party services.

11. The device of claim 9, wherein the service account relates to a network accessible user interface to manage connectivity of the device with one or more user devices associated with the service account and one or more devices associated with the user based on social networking associations with third party services.

12. The device of claim 9, wherein the graphical display is displayed during display of image data by the device.

13. The device of claim 9, wherein the graphical display relates to a pop-up display message including an identifier of one or more of a third party service and device associated with the service account of the user.

14. The device of claim 9, wherein transmitting content relates to transmission to a server associated with a third party service, wherein the content is directly transmitted to a user account of the third party service based on user credentials data stored by the service account.

15. The device of claim 9, wherein transmitting content relates to transmission to an image display device associated with a service account of the user.

16. The device of claim 9, further comprising receiving a configuration command by the device based on selection of a user interface of the service account, and configuring operation of the device based on received configuration commands.

17. A system comprising:
a device configured to interoperate with network based services by way of a communication network; and
an account server configured to communicate with the device by way of the communication network, the account server configured to
detect registration of the device with a service account,
provide a user interface for the service account to the device via the communication network, the user interface including a graphical display for user selection to manage connectivity of the device based on the service account,
receive a user selection of transmitted media for a network based service based on user selection of the graphical display, wherein the network based service comprises a social networking service,
transmit the media to the network based service based on the user selection; and
display a grid pattern for a user to enter an access code for registration, and detecting user selected portions of the grid pattern for device registration.

18. The device of claim 17, wherein the account server is further configured to provide a user interface to manage settings of the device.

19. The device of claim 17, wherein the account server is further configured to provide a user interface to manage connectivity of the device with one or more third party services.

20. The device of claim 17, wherein the account server is further configured to manage transmission of content relative the device and another device associated with the service account.

21. The device of claim 17, wherein the account server is further configured to generate a coded pattern for device registration, and grant access to the device based on verification of the coded pattern transmitted by the device.

22. The device of claim 17, wherein the account server is further configured to store identification of media played by the device, and forward content to the device based on the identification.

23. The device of claim 17, wherein the account server is further configured to allow remote browsing of data stored by a second device registered with the service account.

24. A non-transitory computer readable medium comprising a computer program product including computer executable code for providing device interoperation with one or more network based services, the computer program product comprising:
computer readable code to detect registration of the device with a service account;
computer readable code to provide a user interface for the service account to the device via the communication network, the user interface including a graphical display for user selection to manage connectivity of the device based on the service account;
computer readable code to receive a user selection of transmitted media for a network based service based on user selection of the graphical display, wherein the network based service comprises a social networking service;
computer readable code to transmit the media to the network based service based on the user selection; and computer readable code to display a grid pattern for a user to enter an access code for registration, and detecting user selected portions of the grid pattern for device registration.

25. The computer program product of claim 24, further comprising computer readable code to provide a user interface to manage settings of the device.

26. The computer program product of claim 24, further comprising computer readable code to provide a user interface to manage connectivity of the device with one or more third party services.

27. The computer program product of claim 24, further comprising computer readable code to manage transmission of content relative the device and another device associated with the service account.

28. The computer program product of claim 24, further comprising computer readable code to generate a coded pattern for device registration, and grant access to the device based on verification of the coded pattern transmitted by the device.

29. The computer program product of claim 24, further comprising computer readable code to store identification of media played by the device, and forward content to the device based on the identification.

30. The computer program product of claim 24, further comprising computer readable code to allow remote browsing of data stored by a second device registered with the service account.

* * * * *